United States Patent
Stroud

(10) Patent No.: US 10,708,163 B1
(45) Date of Patent: Jul. 7, 2020

(54) METHODS, SYSTEMS, AND COMPUTER READABLE MEDIA FOR AUTOMATIC CONFIGURATION AND CONTROL OF REMOTE INLINE NETWORK MONITORING PROBE

(71) Applicant: Keysight Technologies, Inc., Santa Rosa, CA (US)

(72) Inventor: Jonathan Glenn Stroud, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 21 days.

(21) Appl. No.: 16/035,542

(22) Filed: Jul. 13, 2018

(51) Int. Cl.
*H04L 12/26* (2006.01)
*H04L 29/12* (2006.01)
*H04L 29/06* (2006.01)

(52) U.S. Cl.
CPC .......... *H04L 43/12* (2013.01); *H04L 61/6022* (2013.01); *H04L 63/0227* (2013.01); *H04L 69/22* (2013.01)

(58) Field of Classification Search
CPC . H04L 43/12; H04L 61/6022; H04L 63/0227; H04L 69/22
See application file for complete search history.

(56) References Cited

U.S. PATENT DOCUMENTS

| 6,898,632 | B2 | 5/2005 | Gordy et al. |
| 7,437,474 | B2 | 10/2008 | Iyer et al. |
| 7,492,713 | B1 | 2/2009 | Turner et al. |
| 7,505,416 | B2 | 3/2009 | Gordy et al. |
| 7,936,682 | B2 | 5/2011 | Singh et al. |
| 8,326,919 | B1 | 12/2012 | Takkallapally et al. |
| 9,065,723 | B2 * | 6/2015 | Stevens .................. H04L 43/12 |
| 9,117,084 | B2 | 8/2015 | Zecheru |
| 9,473,451 | B2 | 10/2016 | Bondrescu |

(Continued)

FOREIGN PATENT DOCUMENTS

| CN | 102447630 A | 5/2012 |
| EP | 2 850 781 B1 | 6/2019 |

(Continued)

OTHER PUBLICATIONS

US 8,166,549 B2, 04/2012, Milliken et al. (withdrawn)

(Continued)

*Primary Examiner* — Azizul Choudhury

(57) ABSTRACT

A method for automatic configuration and control of a remote inline network monitoring probe includes receiving packets from a router or firewall associated with a network being monitored by the inline network monitoring probe. A source medium access control (MAC) and a source IP address are extracted from a first packet of the packets received from the router or firewall. The method further includes storing the source IP address and the source MAC address in memory of the inline network monitoring probe. The method further includes changing a MAC address of the inline network monitoring probe to the source MAC address. The method includes assigning the source IP address to the inline network monitoring probe. The method further includes using the source MAC address and the source IP address to communicate with a remote network monitoring control center.

14 Claims, 7 Drawing Sheets

(56) References Cited

U.S. PATENT DOCUMENTS

| | | |
|---|---|---|
| 2001/0013106 A1 | 8/2001 | Asano |
| 2004/0255167 A1 | 12/2004 | Knight |
| 2005/0021702 A1 | 1/2005 | Rangarajan et al. |
| 2006/0109793 A1 | 5/2006 | Kim et al. |
| 2006/0253906 A1 | 11/2006 | Rubin et al. |
| 2007/0056038 A1 | 3/2007 | Lok |
| 2007/0240218 A1 | 10/2007 | Tuvell et al. |
| 2008/0127335 A1 | 5/2008 | Khan et al. |
| 2008/0295172 A1 | 11/2008 | Bohacek |
| 2009/0006841 A1 | 1/2009 | Ormazabal et al. |
| 2009/0172818 A1 | 7/2009 | Sutherland et al. |
| 2010/0100963 A1 | 4/2010 | Mahaffey |
| 2010/0226345 A1 | 9/2010 | Qu et al. |
| 2011/0058553 A1 | 3/2011 | Brzozowski |
| 2011/0283140 A1 | 11/2011 | Stevens et al. |
| 2011/0305241 A1 | 12/2011 | Yang |
| 2012/0020359 A1 | 1/2012 | Jiang |
| 2012/0311185 A1 | 12/2012 | Li |
| 2013/0054762 A1 | 2/2013 | Asveren |
| 2013/0227170 A1 | 8/2013 | Zha et al. |
| 2014/0226457 A1 | 8/2014 | Hsueh et al. |
| 2014/0229615 A1* | 8/2014 | Hsueh ............... H04L 67/2842 709/224 |
| 2015/0124622 A1* | 5/2015 | Kovvali ............ H04W 28/0215 370/236 |
| 2016/0094632 A1* | 3/2016 | Jain .................. H04L 41/0803 709/204 |

FOREIGN PATENT DOCUMENTS

| | | |
|---|---|---|
| WO | WO 2013/173484 A1 | 11/2013 |
| WO | WO 2014/047548 A1 | 3/2014 |

OTHER PUBLICATIONS

Decision to grant a European patent pursuant to Article 97(1) EPC for European Application Serial No. 13790332.4 (dated May 31, 2019).

Decision to refuse a European Patent Application for European Patent Application No. 13 838 955.6 (dated Jun. 1, 2018).

Commonly-assigned, co-pending U.S. Appl. No. 15/947,274 for "Methods, Systems, and Computer Readable Media for Network Security Testing Using at Least One Emulated Server," (Unpublished, filed Apr. 6, 2018).

Extended European Search Report for European Application No. 13838955.6 (dated May 27, 2016).

Extended European Search Report for European Application No. 13790332.4 (dated Dec. 11, 2015).

Notice of Allowance and Fee(s) Due for U.S. Appl. No. 13/650,115 (dated Sep. 23, 2015).

Communication of European publication number and information on the application of Article 67(3) EPC for European Application No. 13838955.6 (dated Jul. 1, 2015).

Notice of Allowance and Fee(s) Due & Examiner-Initated Interview Summary for U.S. Appl. No. 13/472,116 (dated Mar. 30, 2015).

Non-Final Office Action for U.S. Appl. No. 13/650,115 (dated Feb. 27, 2015).

Communication of European Publication Number and Information on the Application of Article 67(3) EPC for European Patent Application No. 13790332.4 (dated Feb. 25, 2015).

Non-Final Office Action for U.S. Appl. No. 13/472,116 (dated Aug. 18, 2014).

Notification of Transmittal of the International Search Report and the Written Opinion of the International Searching Authority or the Declaration for International Application No. PCT/US2013/061161 (dated Jan. 16, 2014).

Notification of Transmittal of the International Search Report and the Written Opinion of the International Searching Authority, or the Declaration for PCT International Patent Application No. PCT/US2013/041193 (dated Aug. 23, 2013).

Wing et al., "Port Control Protocol (PCP) draft-ietf-pcp-base-27," pp. 1-107 (Sep. 20, 2012).

Wing et al., "Port Control Protocol (PCP) draft-ietf-pcp-base-26," pp. 1-101 (Jun. 5, 2012).

Wing, "Port Control Protocol," The Internet Protocol Journal, vol 14., No 4., pp. 1-32 (Dec. 2011).

IxLoad, "Library updates with baseline traffic captures to measure detection accuracy," IxLoad-Attack: PVM, IxTracker ID: FEA642983, IxLoad 5.40, RT3/2011 Release, pp. 1-12 (Mar. 2011).

Woodyatt, "Recommended Simple Security Capabilities in Customer Premises Equipment (CPE) for Providing Residential IPv6 Internet Service," RFC 6092, pp. 1-36 (Jan. 2011).

Wellington, "Secure Domain Name System (DNS) Dynamic Update," RFC 3007, pp. 1-9 (Nov. 2000).

Waldbusser, "Remote Network Monitoring Managemtn Information Base," RFC 2819, pp. 1-98 (May 2000).

Vixie et al., "Dynamic Updates in the Domain Name System (DNS Update)," RFC 2136, pp. 2-26 (Apr. 1997).

* cited by examiner

METHODS, SYSTEMS, AND COMPUTER READABLE MEDIA FOR AUTOMATIC CONFIGURATION AND CONTROL OF REMOTE INLINE NETWORK MONITORING PROBE

TECHNICAL FIELD

The subject matter described herein relates to network monitoring probes. More particularly, the subject matter described herein relates to methods, systems, and computer readable media for automatic configuration and control of remote inline network monitoring probe.

BACKGROUND

Network monitoring probes are devices that are used to monitor traffic in a network. Often it is desirable to have network monitoring probes located remotely from the network operator or service provider to monitor traffic associated with one or more customer networks. For example, a network service provider, such as an Internet service provider, may desire to monitor traffic in customer networks. In order to monitor such traffic, the Internet service provider may deploy network monitoring probes in the customer networks. In one example, the customer networks may be networks located in commercial locations. In another example, the networks may be networks located in residential locations. In either case, the networks will have a modem or access point that provides access to the wide area network (WAN). The customer may also have a router or firewall to route traffic and protect the customer's internal network. The monitoring probes may be located inline between the modem or access point and the router or firewall.

One problem associated with deploying network monitoring probes in customer networks is that the probes must be configured so that the probes can be communicated with and monitored by the network service provider. Configuring network monitoring probes requires the assignment of a public Internet protocol (IP) address to each probe. If each network monitoring probe is required to have its own public IP address, the cost of such addresses can also be cost-prohibitive.

As indicated above, one particular type of monitoring that may be desirable to perform is inline monitoring between a modem or AP and a router or firewall owned by the customer. To perform such monitoring, the service provider may place an inline probe between the modem or AP and the router or firewall. The service provider must configure the probe to be able to receive commands and send data to a remote monitoring control center. For the reasons set forth above, manual configuration of such probes, especially when multiple different customer sites are being monitored, can be labor and cost-prohibitive.

Accordingly, in light of these difficulties there exists a need for improved methods, systems, and computer readable media for configuration and control of a remote inline network monitoring probe.

SUMMARY

The subject matter described herein includes methods, systems, and computer readable media for automatic configuration and control of a remote in-line network monitoring probe. One method for automatic configuration and control of a remote inline network monitoring probe includes, at an inline network monitoring probe including a central processing unit (CPU), receiving packets from a router or firewall associated with a network being monitored by the inline network monitoring probe. The method further includes extracting, from a first packet received from the router or firewall, a source medium access control (MAC) address and a source Internet protocol (IP) address. The method further includes storing the source IP address and the source MAC address in memory of the inline network monitoring probe. The method further includes changing a MAC address of the inline network monitoring probe to the source MAC address. The method further includes assigning the source IP address to the inline network monitoring probe. The method further includes using the source MAC address and the source IP address to communicate with a remote network monitoring control center.

The subject matter described herein further includes a system for automatic configuration and control of a remote inline network monitoring probe. The system includes an inline network monitoring probe including a central processing unit (CPU). The inline probe further includes a first network port for receiving packets from a router or firewall associated with a network being monitored by the inline network monitoring probe. The inline probe further includes an auto-configuration module for extracting, from a first packet received from the router or firewall, a source medium access control (MAC) address and a source Internet protocol (IP) address, storing the source IP address and the source MAC address in memory of the inline network monitoring probe, changing a MAC address of the inline network monitoring probe to the source MAC address, assigning the source IP address to the inline network monitoring probe, wherein the inline network monitoring probe uses the source MAC address and the source IP address to communicate with a remote network monitoring control center.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
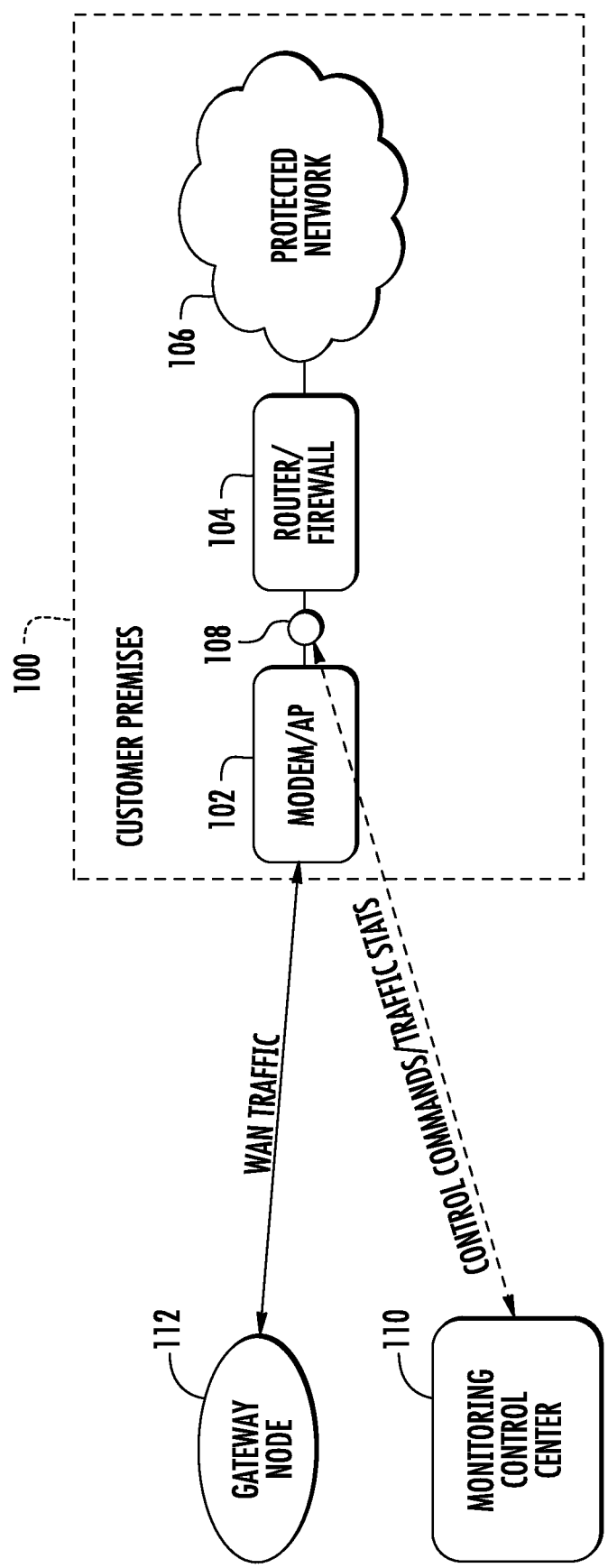
FIG. 1 is a network diagram illustrating a remote inline network monitoring probe positioned to monitor traffic between a modem or access point and a router or firewall.

The subject matter described herein relates to methods, systems, and computer readable media for automatic configuration and control of a remote inline network monitoring probe. FIG. 1 illustrates an exemplary deployment scenario for a remote inline network monitoring probe. Referring to FIG. 1, a service provider may desire to monitor traffic located at customer premises 100. In the illustrated example, customer premises 100 includes a modem and/or access point (AP) 102, a router and/or firewall (FW) 104, and a protected network 106. In the Illustrated example, an inline probe 108 is located between modem/AP 102 and router/firewall 104. Inline probe 108 is a device provided by the service provider to monitor traffic between modem/AP 102 and router/firewall 104. Inline probe 108 may function as a "bump" in the wire or cable between modem/AP 102 and router/firewall 104 to passively forward packets and generate statistics based on the packets that traverse probe 108. Examples of statistics that may be collected by probe 108 will be described below.

In order to initiate such monitoring, inline probe 108 must be capable of receiving control commands from a monitoring control center 110 that may be located remotely from probe 108. Probe 108 also needs to be configured to send traffic statistics to monitoring control center 110.

In order to be configured to perform the aforementioned operations, probe 108 needs a public IP address and a MAC address. As stated above, manually assigning a public IP address can be labor and cost prohibitive, especially when the service provider needs to monitor multiple customer premises. In addition, assigning a public IP address to probe 108 can also be cost prohibitive as the number of network monitoring locations increases.

Accordingly, to avoid such difficulties, probe 108 may capable of learning the IP address and MAC address used by router/firewall 104 and using these addresses to receive commands from monitoring control center 110. Probe 108 may also learn the MAC address of a gateway 112 through which protected network 106 exchanges traffic with a wide area network, such as the Internet.

Figure 2A:
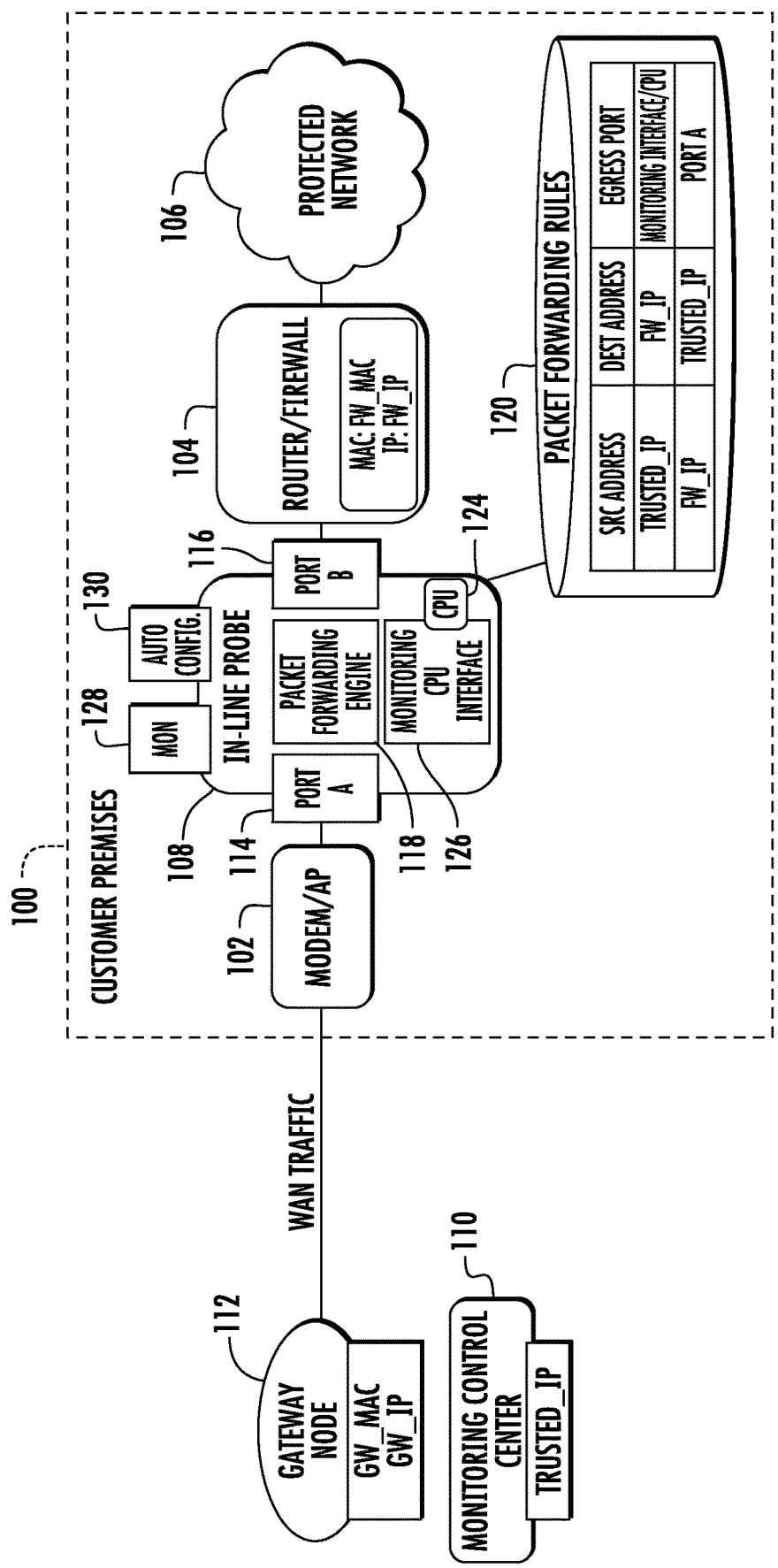
FIG. 2A is a network diagram illustrating a remote inline network monitoring probe that automatically configures itself to communicate with a control center.

FIG. 2A illustrates details of probe 108 for automatically learning router IP and MAC addresses. Referring to FIG. 2A, probe 108 includes a first port 114 connected to modem/AP 102 and a second port 116 connected to router/firewall 104. Probe 108 further includes a packet forwarding engine 118 that access packet forwarding rules 120 to forward packets. Inline probe 108 further includes a central processing unit 124 and a monitoring CPU interface 126. A monitoring module 128 may generate statistics for packets that traverse inline probe 108. In one example, monitoring module 128 may collect remote monitoring (RMON) statistics, as described in Internet Engineering Task Force (IETF) Request for Comments (RFC) 2819, May 2000, the disclosure of which is incorporated herein by reference in its entirety. Briefly, such statistics involve passively counting packets matching configurable criteria that traverse probe 108.

Figure 2B:
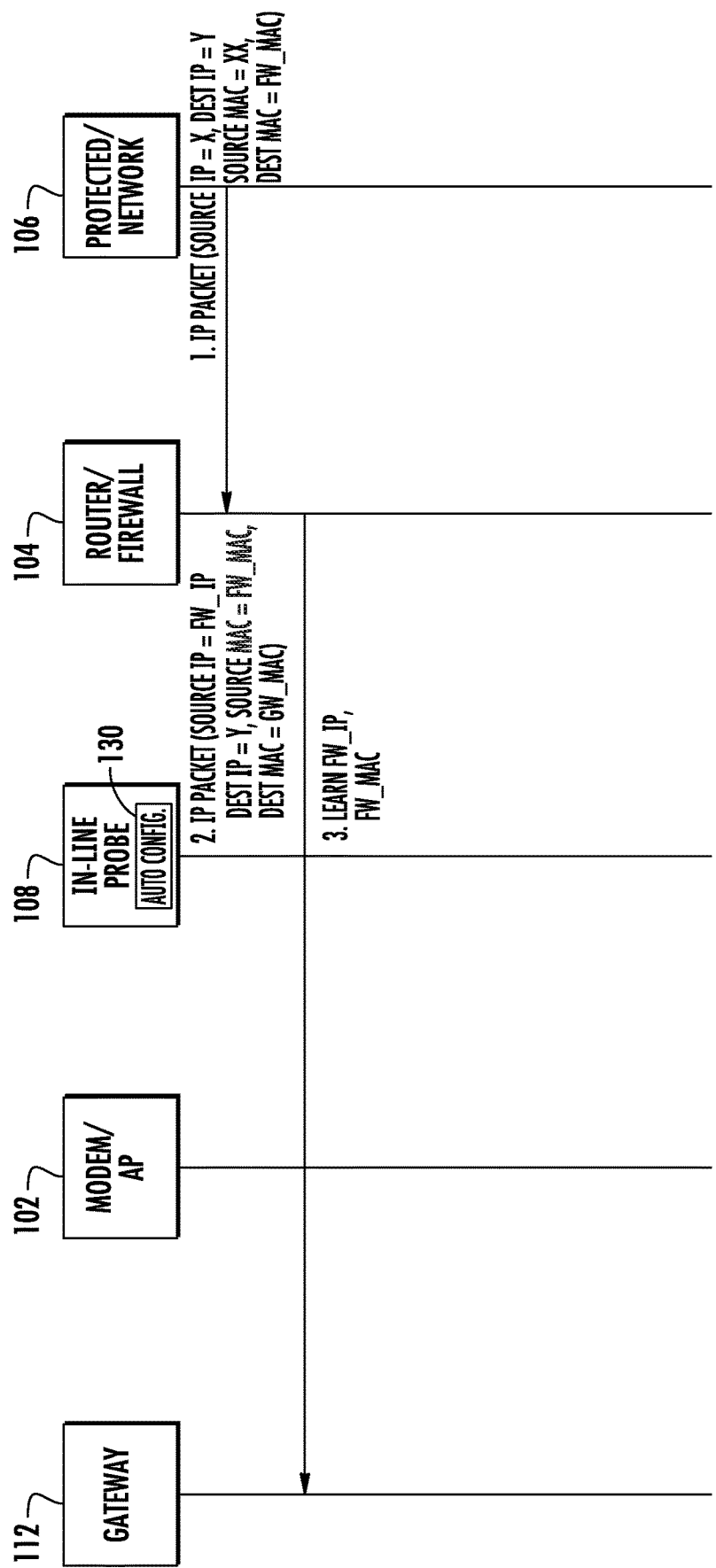
FIG. 2B is a message flow diagram illustrating exemplary messages exchanged during automatic configuration of a remote inline network monitoring probe.

Inline probe 108 also includes an auto-configuration module 130 that performs automatic configuration of inline probe 108. FIG. 2B illustrates exemplary messaging between the entities illustrated in FIG. 2A where inline probe 108 automatically configures itself. Referring to FIG. 2B in line 1, an IP packet is originated from protected network 106. The IP packet has a source IP address corresponding to the sending node, a destination IP address corresponding to the destination node, a source MAC address corresponding to the MAC address of the adjacent sending node and a destination MAC address of firewall/router 104. Upon receiving the IP packet, router/firewall 104 determines that the packet is not addressed to it. Accordingly, router/firewall 104 changes the destination MAC address to the MAC address associated with the next hop in the network towards the destination for the packet. In the illustrated example, the next hop is modem/AP 102 because inline probe 108 is transparent to router/firewall 104. Router/firewall 104 may also change the source IP address from the original source IP address of the node in protected network 106 that transmitted the packet to a public IP address for router/firewall 104. In the illustrated example, the public IP address is FW_IP. Router/firewall 104 does not change the destination IP address in the packet. Router/firewall 104 changes the source MAC address in the outbound packet to the MAC address of router/firewall 104, which in the illustrated example is FW_MAC. In step 2, router/firewall 104 forwards the packet to gateway 112 via inline probe 108 and modem/AP 102.

In step 3, inline probe 108 receives the packet and forwards the packet to modem/AP 102. While forwarding the packet, auto-configuration module 130 may verify that the packet is a unicast packet. Verifying that the packet is a unicast packet is necessary because inline probe 108 needs to learn the MAC address of gateway 112. If the packet is a broadcast or multicast packet, the destination MAC address will not be a valid MAC address for gateway 112. Inline probe 108 stores the source IP and MAC addresses from the IP packet. The source IP address is FW_IP, which is the public IP address of router/firewall 104. Inline probe 108 also stores the source MAC address of the IP packet. The source MAC address is FW_MAC, which is the MAC address of router/firewall 104. Inline probe 108 may change the MAC address of its local/probe CPU to the MAC address extracted from the IP packet. Inline probe 108 may also assign the source IP address from the IP packet to the public network interface of inline probe 108. The original packet is forwarded to gateway 112, which may forward the packet to its destination. Thus, using the steps illustrated in FIG. 2B, inline probe automatically configures itself with the IP and MAC address of a router or firewall in a customer's network. Inline probe 108 also configures itself to recognize the MAC address of gateway 112.

Figure 3A:
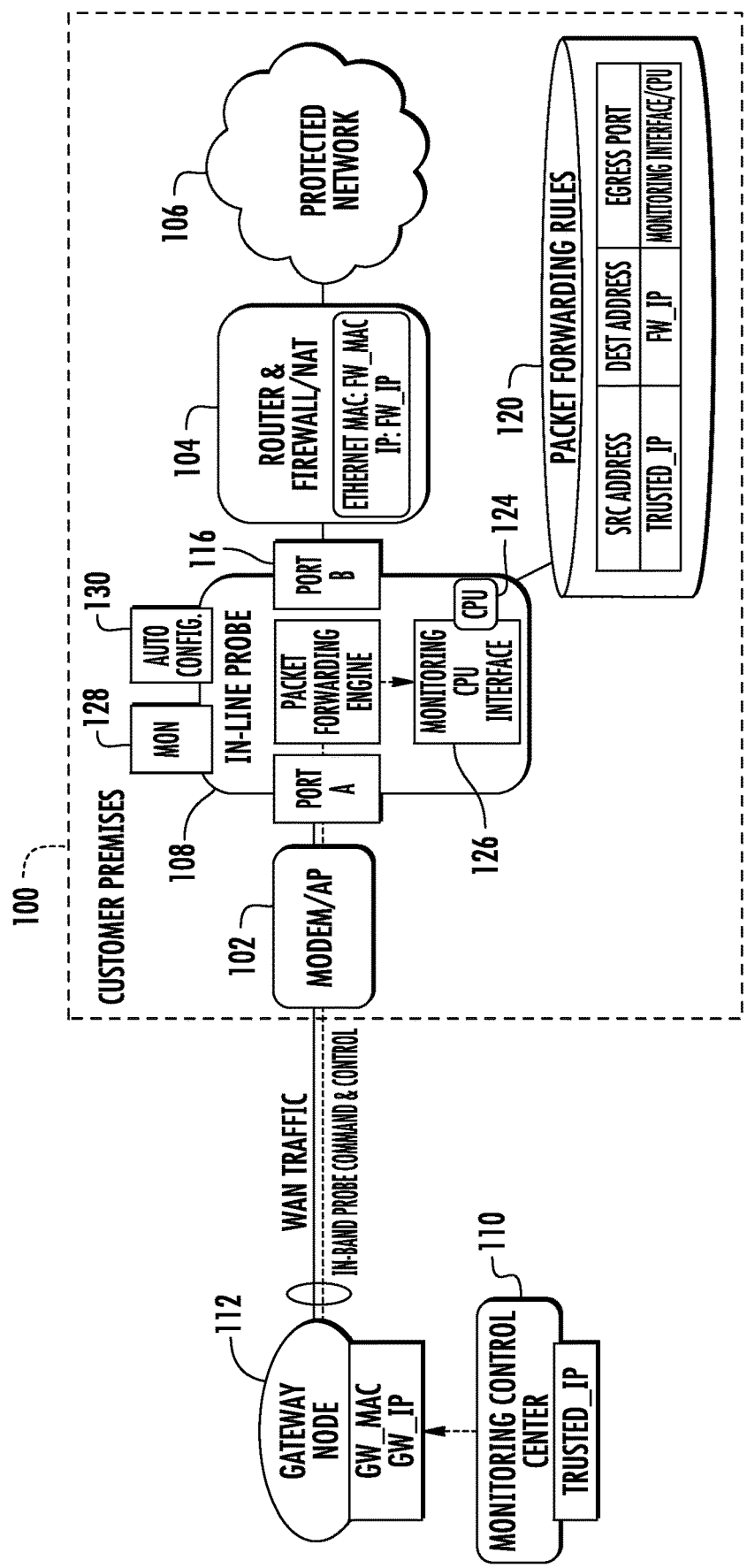
FIG. 3A is a network diagram illustrating remote control of an inline probe using the IP and MAC addresses automatically learned in FIG. 2A.

Once inline probe 108 is automatically configured with the IP and MAC address of router/firewall 104, there needs to be a mechanism for control center 110 to communicate with inline probe 108. Stated differently, because control center 110 is located in a wide area network, such as the Internet, there needs to be a way for inline probe 108 to distinguish between WAN traffic destined for protected network 106 and control traffic from control center 110. FIG. 3A illustrates a mechanism through which inline probe 108 may be configured to distinguish control traffic from control center 110 from other WAN traffic. Referring to FIG. 3A, inline probe 108 may be configured to recognize a predetermined set of IP addresses as trusted IP addresses that are associated with control center 110. In FIG. 3A the trusted IP address is illustrated as trusted_IP. Thus, when probe 108 receives a packet from Port A 114, probe 108 examines the source IP address in the packet. If the source IP is one of the trusted IP addresses and the packet is addressed to the IP and MAC addresses of router/firewall 104, inline probe 108 forwards the packet to its CPU 124, which generates a response to the packet and sends the response to control center 110. If a received IP packet is not from one of the trusted IP addresses, inline probe 108 simply forwards the packet to router/firewall 104.

Figure 3B:
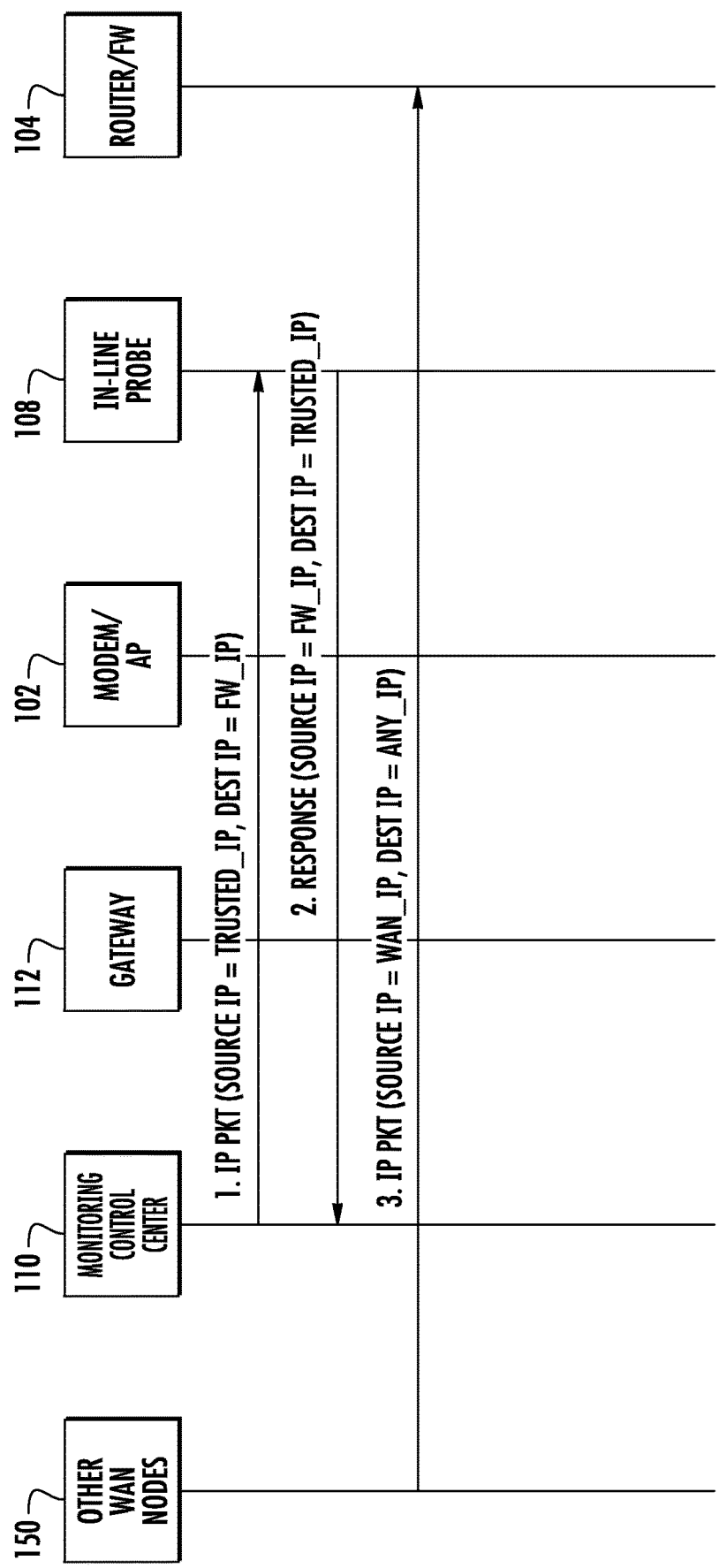
FIG. 3B is a message flow diagram illustrating exemplary processing of control traffic and other WAN traffic by an automatically configured remote inline network monitoring probe.

FIG. 3B illustrates the processing of control and other WAN traffic by inline probe 108. Referring to FIG. 3B, in line 1, monitoring control center 110 sends an IP packet addressed to the destination IP address of FW_IP, corresponding to router/firewall 104 with a source IP address set to the trusted IP address. The IP packet passes through gateway 112 and modem/AP 102. Modem/AP 102 may change the destination MAC address in the Ethernet frame encapsulating the IP packet to the MAC address of router/firewall 104. The IP packet is received by inline probe 108. Inline probe 108, upon receipt of the packet sees that the packet is encapsulated in an Ethernet frame addressed to the MAC address of router/firewall 104 and that the packet is addressed to FW_IP, which is the public IP address that the inline probe 108 uses to identify itself. Accordingly, the packet could be for inline probe 108 or for a node in protected network 106. Inline probe 108 examines the source IP address in the packet and determines that the packet is from one or more of the trusted IP addresses associated with monitoring control center 110. Accordingly, inline probe 108 generates a response to the IP packet. If the incoming packet is a network management request packet, the response may be a response to the network monitoring request. In the illustrated example, the response has the source address of FW_IP and the destination IP address of trusted_IP. Inline probe 108 forwards the response packet to monitoring center 110.

The IP address that monitoring control center 110 inserts in the IP packet in line 1 of the message flow diagram in FIG. 3 is a spoofed IP address because the IP address is associated with router/firewall 104, but the packet is intended for inline probe 108. Using a spoofed IP address to communicate with both a router and an inline probe avoids the need for a separate IP address to be assigned to inline probe 108 and thus increases configuration efficiency. The destination MAC address in the Ethernet frame that carries the IP packet in line 1 is also a spoofed MAC address because the MAC address is the MAC address of router/firewall 104 that inline probe 108 uses to intercept packets that are intended for probe 108.

In addition to being able to recognize command and control traffic from monitoring control center 110, inline probe 108 is also capable of identifying and forwarding all other traffic to the router/firewall 104. In line 3 of the message flow diagram, inline probe 108 receives a packet from a node in WAN other than monitoring control center 110, illustrated by other WAN nodes 150. The source IP address in the packet is illustrated in FIG. 3B as WAN_IP, which may correspond to the IP address of the sending node. Inline probe 108 examines the source IP address in the packet. In this example, it is assumed that WAN_IP is not one of the trusted IP addresses that inline probe 108 is configured to recognize as being associated with monitoring control center 110. Accordingly, inline probe 108 forwards the packet to router/firewall 104, which may either block the packet or forward the packet to a node in protected network 106. Thus, using the steps in FIG. 3B, inline probe 108 is controllable by a remote monitoring control center using one or more source IP addresses that inline probe 108 identifies as being associated with the monitoring control center 110 and an automatically learned destination IP address associated with the network being monitored.

It should also be noted that inline probe 108 uses the MAC address of router/firewall 104 to identify packets as being addressed to inline probe 108. If inline probe 108 used its own unique MAC address, modem 102 would have to be configured to associate the IP address used by inline probe 108 with the unique MAC address of inline probe 108. However, because inline probe 108 shares an IP address with router/firewall 104, modem 102 already associates the shared IP address with the MAC address of router/firewall 104. Because an IP address cannot be associated with two different MAC addresses, by having inline probe change its MAC address to the MAC address of router/firewall 104, all packets addressed to the shared IP address will resolve to the shared MAC address and either be processed by probe 108 or router/firewall 104, depending on the source IP address.

Figure 4:
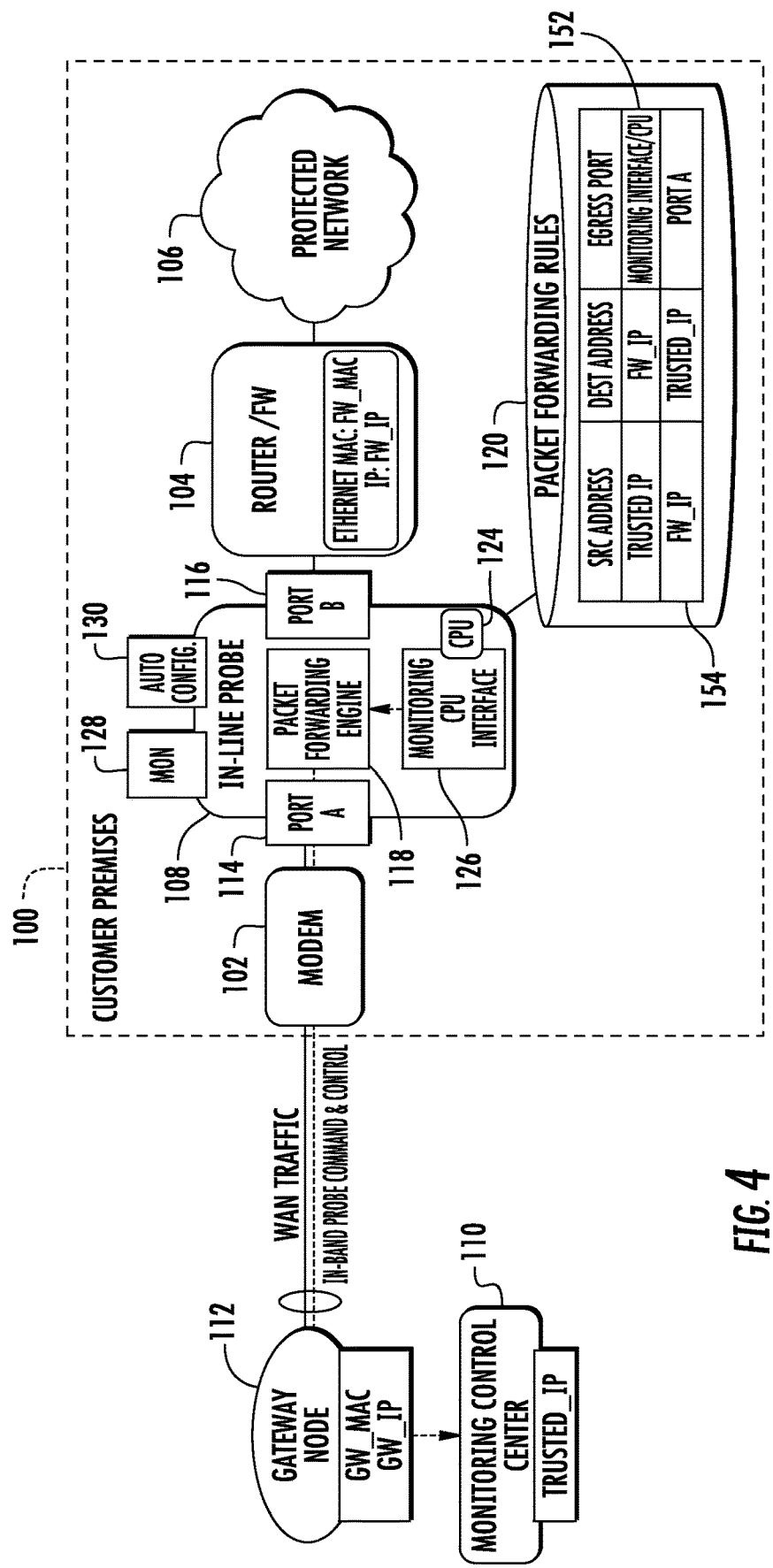
FIG. 4 is a network diagram illustrating an exemplary forwarding table configuration of an automatically configured remote inline network monitoring probe.

FIG. 4 illustrates rules that may be configured in inline probe 108 after auto-configuration to process and forward traffic. Referring to FIG. 4, packet forwarding rules 120 used by inline probe 108 include a first forwarding rule 152 and indicates that packets from the trusted IP address associated with monitoring control center 110 and destined to the firewall IP address FW_IP should be sent to the monitoring interface or CPU of inline probe 108. Packet forwarding rules 120 include a second packet forwarding rule 154 that indicates that packets addressed to the trusted IP address and from the firewall IP address should be sent on port A, where the packets will be forwarded to monitoring control center 110. Any packet received on port B will be forwarded on port A, so rule 152, although shown for illustrative purposes, may be unnecessary. Any packet received on port A that is not from one of the trusted IP addresses will be forwarded on port B.

Figure 5:
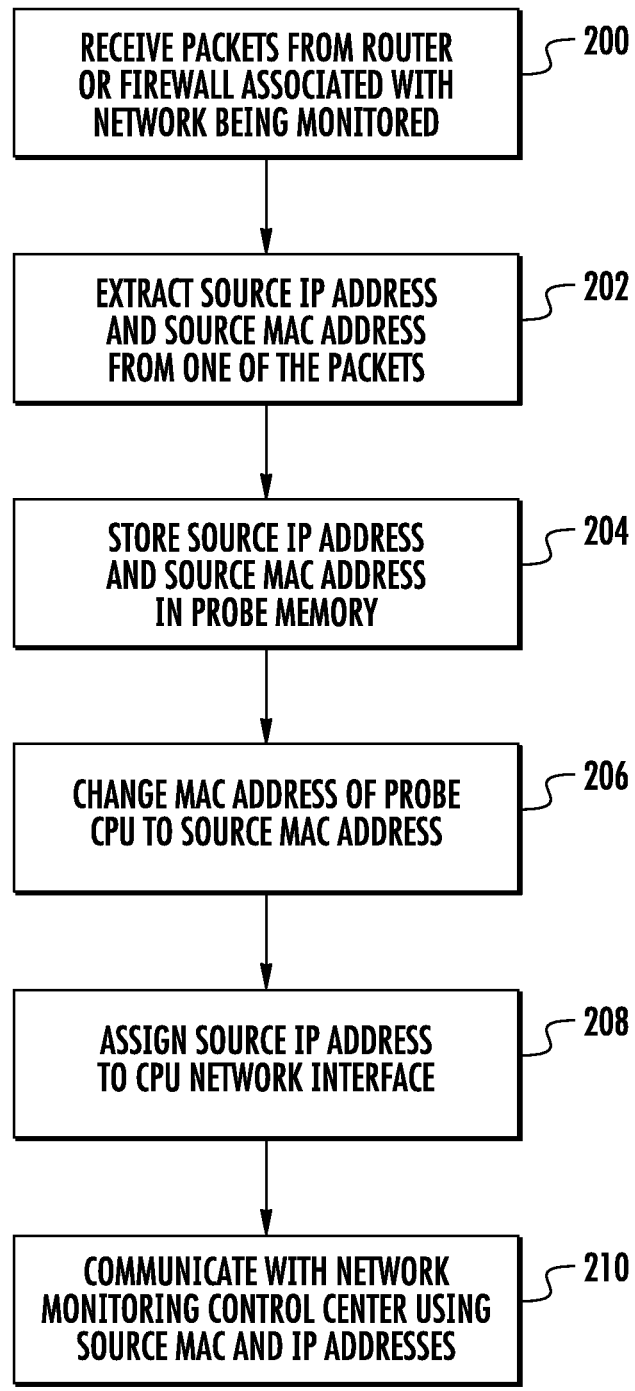
FIG. 5 is a flow chart illustrating an exemplary process for automatic configuration and control of a remote inline network monitoring probe.

FIG. 5 is a flow chart illustrating exemplary steps that may performed by inline probe 108 for automatically configuring itself to passively monitor traffic and to receive commands from a monitoring control center. Referring to FIG. 5, in step 200, packets are received from a router or firewall associated with a network being monitored. For example, inline probe 108 may receive one or more IP packets from router/firewall 104. The packets may be IP packets destined for the WAN.

In step 202, a source IP address and a source MAC address are extracted from one of the packets. For example, inline probe 108 may extract the source MAC address and source IP address from a packet received from router/firewall 104.

In step 204, the source IP address and the source MAC address are stored in probe memory. For example, inline probe 108 may store the source IP address and the source MAC address extracted from the packet in local memory of probe 108.

In step 206, the MAC address of the probe is changed to the source MAC address. For example, probe 108 may change the MAC address that it associates with itself or CPU 124 to the MAC address from the IP packet received from router/firewall 104.

In step 208, source IP address is assigned to probe 108. For example, probe 108 may assign the IP address extracted from the packet in step 204 to monitoring CPU interface 126 associated with CPU 124. As a result, packets addressed to this IP address may be forwarded to CPU 124, instead of router/firewall 104, provided that the packets have one of the protected source IP addresses.

In step 210, probe 108 communicates with network monitoring control center 110 using the source MAC and IP addresses. For example, probe 108 may receive commands from control center 110 addressed to the source IP address and MAC address of router/firewall 104 but redirect those packets to CPU 124 if the packets are from one of the trusted IP addresses. The packets sent from remote monitoring control center 100 to CPU 124 may be control packets for controlling the functionality of probe 108, updating software or firmware of probe 108, and collecting network monitoring statistics from probe 108. If a packet is identified as being a control packet, probe 108 may generate and send a response to network monitoring control center 110.

After automatically configuring itself using the steps illustrated in FIG. 5, probe 108 passively monitors packets directed to protected network 106 by forwarding the packets to protected network 106 without modifying the packets but collecting statistics, such as RMON statistics, based on the monitored packets. Probe 108 can also be used to inject probe traffic into the public network 106, and probe 108 may monitor quality of service provided to the protected network 106 and/or router/firewall 104. For example, probe 108 may monitor latency, throughput, or jitter associated with the WAN interface.

Thus, using the steps described herein, an inline probe can automatically configure itself to monitor network traffic. Such a probe does not require its own unique public IP address and can instead learn a public IP address of the network being monitored. As a result, probe 108 is suitable for widespread deployments where a service provider seeks to monitor multiple locations without requiring labor-intensive configuration of the monitoring probe at each location.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatic configuration and control of a remote inline network monitoring probe, the method comprising:
   at an inline network monitoring probe including a central processing unit (CPU):
      receiving packets from a router or firewall associated with a network being monitored by the inline network monitoring probe;
      extracting, from a first packet of the packets received from the router or firewall, a source medium access control (MAC) address and a source Internet protocol (IP) address;
      storing the source IP address and the source MAC address in memory of the inline network monitoring probe;
      changing a MAC address of the inline network monitoring probe to the source MAC address;
      assigning the source IP address to the inline network monitoring probe; and
      using the source MAC address and the source IP address to communicate with a remote network monitoring control center
   wherein the inline network monitoring probe includes a first port for connecting to a router or firewall and a second port for connecting to a modem or access point, wherein the inline network monitoring probe is configured to recognize at least one trusted IP address as being associated with the remote monitoring control center, and wherein using the source IP address and the source MAC address to communicate with the remote monitoring control center includes:
      receiving a second packet over the second port;
      identifying a destination MAC address in the second packet as being the source MAC address extracted from the first packet;
      identifying a destination IP address in the second packet as being the source IP address extracted from the first packet, and, in response, examining a source IP address in the second packet; and
      determining that the source IP address in the second packet is the at least one trusted IP address, and, in response, identifying the second packet as being a control packet from the remote monitoring control center.

2. The method of claim 1 wherein receiving packets from the router or firewall associated with the network being monitored includes receiving IP packets and wherein the source IP address in the first packet is a public IP address of the router or firewall.

3. The method of claim 1 comprising, in response to identifying the second packet as being associated with the remote monitoring control center, responding to the second packet.

4. The method of claim 1 wherein the destination IP address in the second packet comprises a spoofed IP address of the router or firewall.

5. The method of claim 1 wherein the inline network monitoring probe passively monitors packets transmitted to the protected network, generates statistics regarding the monitored packets, and communicates the statistics to the remote monitoring control center.

6. The method of claim 5 wherein the statistics comprise remote monitoring (RMON) statistics.

7. A system for automatic configuration and control of a remote inline network monitoring probe, the system comprising:
   an inline network monitoring probe including:
      a central processing unit (CPU);
      a first network port for receiving packets from a router or firewall associated with a network being monitored by the inline network monitoring probe;
      a second port for connecting to a modem or access point; and
      an auto-configuration module for extracting, from a first packet of the packets received from the router or firewall, a source medium access control (MAC) address and a source Internet protocol (IP) address, storing the source IP address and the source MAC address in memory of the inline network monitoring probe, changing a MAC address of the inline network monitoring probe to the source MAC address, and assigning the source IP address to the inline network monitoring probe,
   wherein the inline network monitoring probe uses the source MAC address and the source IP address to communicate with a remote network monitoring control center, wherein the inline network monitoring probe is configured to recognize at least one trusted IP address as being associated with the remote monitoring control center, and wherein the inline network monitoring probe uses the source IP address and the source MAC address to communicate with the remote monitoring control center by:

receiving a second packet over the second port;

identifying a destination MAC address in the second packet as being the source MAC address extracted from the first packet;

identifying a destination IP address in the second packet as being the source IP address extracted from the first packet, and, in response, examining a source IP address in the second packet; and determining that the source IP address in the second packet is the at least one trusted IP address, and, in response, identifying the second packet as being a control packet from the remote monitoring control center.

8. The system of claim 7 wherein the source IP address in the first packet is a public IP address of the router or firewall.

9. The system of claim 7 wherein the inline probe is configured to, in response to identifying the second packet as being associated with the remote monitoring control center, respond to the second packet.

10. The system of claim 9 wherein the destination IP address in the second packet comprises a spoofed IP address of the router or firewall.

11. The system of claim 7 wherein the inline network monitoring probe is configured to forward traffic received over the second port that is not from the at least one trusted IP address to the router or firewall.

12. The system of claim 7 wherein the inline network monitoring probe includes a monitoring module for monitoring packets transmitted to the protected network, generating statistics regarding the monitored packets, and communicates the statistics to the remote monitoring control center.

13. The system of claim 12 wherein the statistics comprise remote monitoring (RMON) statistics.

14. A non-transitory computer readable medium having stored thereon executable instructions that when executed by a processor of a computer control the computer to perform steps comprising:

at an inline network monitoring probe:

receiving packets from a router or firewall associated with a network being monitored by the inline network monitoring probe;

extracting, from a first packet received from the router or firewall, a source medium access control (MAC) address and a source Internet protocol (IP) address;

storing the source IP address and the source MAC address in memory of the inline network monitoring probe;

changing a MAC address of the inline network monitoring probe to the source MAC address;

assigning the source IP address to the inline network monitoring probe; and using the source MAC address and the source IP address to communicate with a remote network monitoring control center, wherein the inline network monitoring probe includes a first port for connecting to a router or firewall and a second port for connecting to a modem or access point, wherein the inline network monitoring probe is configured to recognize at least one trusted IP address as being associated with the remote monitoring control center wherein using the source IP address and the source MAC address to communicate with the remote monitoring control center includes:

receiving a second packet over the second port;

identifying a destination MAC address in the second packet as being the source MAC address extracted from the first packet;

identifying a destination IP address in the second packet as being the source IP address extracted from the first packet, and, in response, examining a source IP address in the second packet; and determining that the source IP address in the second packet is the at least one trusted IP address, and, in response, identifying the second packet as being a control packet from the remote monitoring control center.

* * * * *